(12) United States Patent
Byrne et al.

(10) Patent No.: US 8,777,623 B2
(45) Date of Patent: Jul. 15, 2014

(54) APPARATUS FOR TEACHING DEFENSIVE DRIVING

(76) Inventors: Thomas Byrne, Ormond Beach, FL (US); David Meehan, Zionsville, IN (US)

( * ) Notice: Subject to any disclaimer, the term of this patent is extended or adjusted under 35 U.S.C. 154(b) by 0 days.

(21) Appl. No.: 13/468,842

(22) Filed: May 10, 2012

(65) Prior Publication Data

US 2013/0095453 A1    Apr. 18, 2013

Related U.S. Application Data

(60) Provisional application No. 61/484,595, filed on May 10, 2011.

(51) Int. Cl.
*G09B 9/42* (2006.01)

(52) U.S. Cl.
CPC ........................................ *G09B 9/42* (2013.01)
USPC .............................................. 434/66; 280/5.52

(58) Field of Classification Search
USPC ..................... 434/66; 280/5.5, 5.52
See application file for complete search history.

(56) References Cited

U.S. PATENT DOCUMENTS

| | | | | |
|---|---|---|---|---|
| 4,449,727 A | * | 5/1984 | Roos | 280/81.6 |
| 4,700,798 A | * | 10/1987 | Johansson et al. | 180/209 |
| 4,998,594 A | * | 3/1991 | Orloski | 180/198 |
| 5,743,562 A | * | 4/1998 | Mottola | 280/767 |

* cited by examiner

*Primary Examiner* — Sam Yao
*Assistant Examiner* — Jennifer L Fassett
(74) *Attorney, Agent, or Firm* — McDonnell Boehnen Hulbert & Berghoff LLP (57) ABSTRACT

An apparatus for teaching defensive driving includes a hub unit removably attachable to an axle of a wheel of a vehicle, and a housing unit. The housing unit includes a swing arm member pivotally affixed therewithin, a wheel-height adjusting mechanism, and at least one wheel assembly swiveling along a vertical axis and affixed at a bottom end of the housing unit. The swing arm member includes a unit for fittingly engaging a portion of the hub unit and a height adjustable member. The height adjusting mechanism is operatingly coupled to the height adjustable member to adjust a height of the wheel relative to a surface of a road, thereby adjusting a friction level between the wheel and the road surface.

13 Claims, 9 Drawing Sheets

APPARATUS FOR TEACHING DEFENSIVE DRIVING

RELATED APPLICATIONS

This application claims the benefit of U.S. Provisional Application No. 61/484,595, filed on May 10, 2011, which is herein incorporated by reference in its entirety.

BACKGROUND

Experienced vehicle drivers know that even just a thin coating of rain, snow or ice can make roads slippery. In heavy rain, the tires of a vehicle may begin to actually ride on the water lying on top of the road pavement. This "hydroplaning" usually occurs at higher speeds, but it also can occur if the vehicle has tread worn or improperly inflated tires. Driving on roads covered with ice or snow can also lead to skids or drifts when the vehicle tires lose their grip on these weather affected roads. Skids or drifts can be caused by over steering, under steering, over braking, over accelerating, and/or driving too fast under these road conditions. As such, drivers can benefit from learning how to handle vehicle skids or drifts by driving a vehicle configured to simulate such driving conditions without the inclement weather conditions.

SUMMARY

Disclosed herein are improved apparatuses and devices for teaching defensive driving.

In one embodiment, an apparatus for teaching defensive driving includes a hub unit removably attachable to an axle of a wheel of a vehicle, and a housing unit. The housing unit includes a swing arm member pivotally affixed therewithin, a wheel-height adjusting mechanism, and at least one wheel assembly swiveling along a vertical axis and affixed at a bottom end of the housing unit. The swing arm member includes a unit for fittingly engaging a portion of the hub unit and a height adjustable member. The height adjusting mechanism is operatingly coupled to the height adjustable member to adjust a height of the wheel relative to a surface of a road, thereby adjusting a friction level between the wheel and the road surface.

These as well as other aspects, advantages, and alternatives will become apparent to those of ordinary skill in the art by reading the following detailed description, with reference where appropriate to the accompanying drawings. Further, it should be understood that this summary section and the rest of this document are intended to provide a discussion of the disclosure by way of example only and not by way of limitation.

Illustrative and exemplary embodiments of the disclosure are described in further detail below with reference to and in conjunction with the figures.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

With reference to the drawings, like reference numerals designate like or corresponding parts throughout the various views.

Overview

In an example embodiment, a drift lift system or apparatus is configured to simulate skid and drift conditions for a driven vehicle. The drift lift apparatus is configured to be securely fastened to wheel studs of a vehicle's wheel hub, while a wheel remains mounted on the wheel hub, in order to simulate different driving tire traction levels associated with or corresponding to different road conditions. A height of the corresponding wheel relative to the drift lift apparatus can be adjusted in small increments so as to set or vary as desired the level of tire contact or friction of the corresponding wheel with a road surface, thereby enabling an initiation of a slide, such as a skid or a drift, at substantially any vehicle speed starting from a walking pace. A couple of drift lift apparatuses can be attached to both rear wheels or both front wheels, thereby providing the ability to simulate either over-steering or under-steering situations, respectively. Further, four drift lift apparatuses can be attached to all four wheels of the vehicle, and the four wheels' contact levels with the road surface can be individually adjusted, thereby enabling a simulation of low friction or reduced traction on road surfaces for each wheel.

Figure 1:
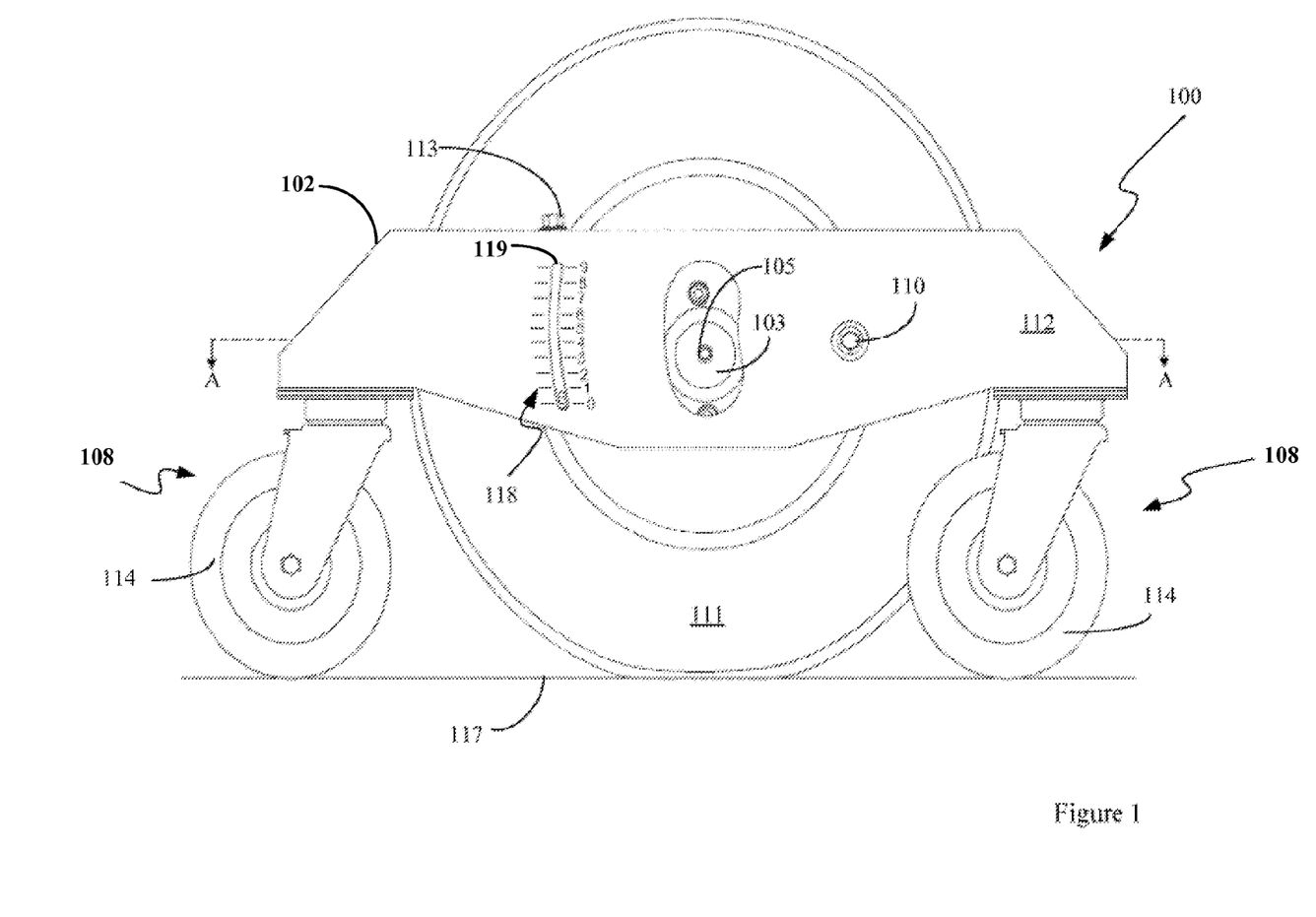
FIG. 1 illustrates a front elevational view of an example embodiment of a drift lift apparatus.
Figure 2:
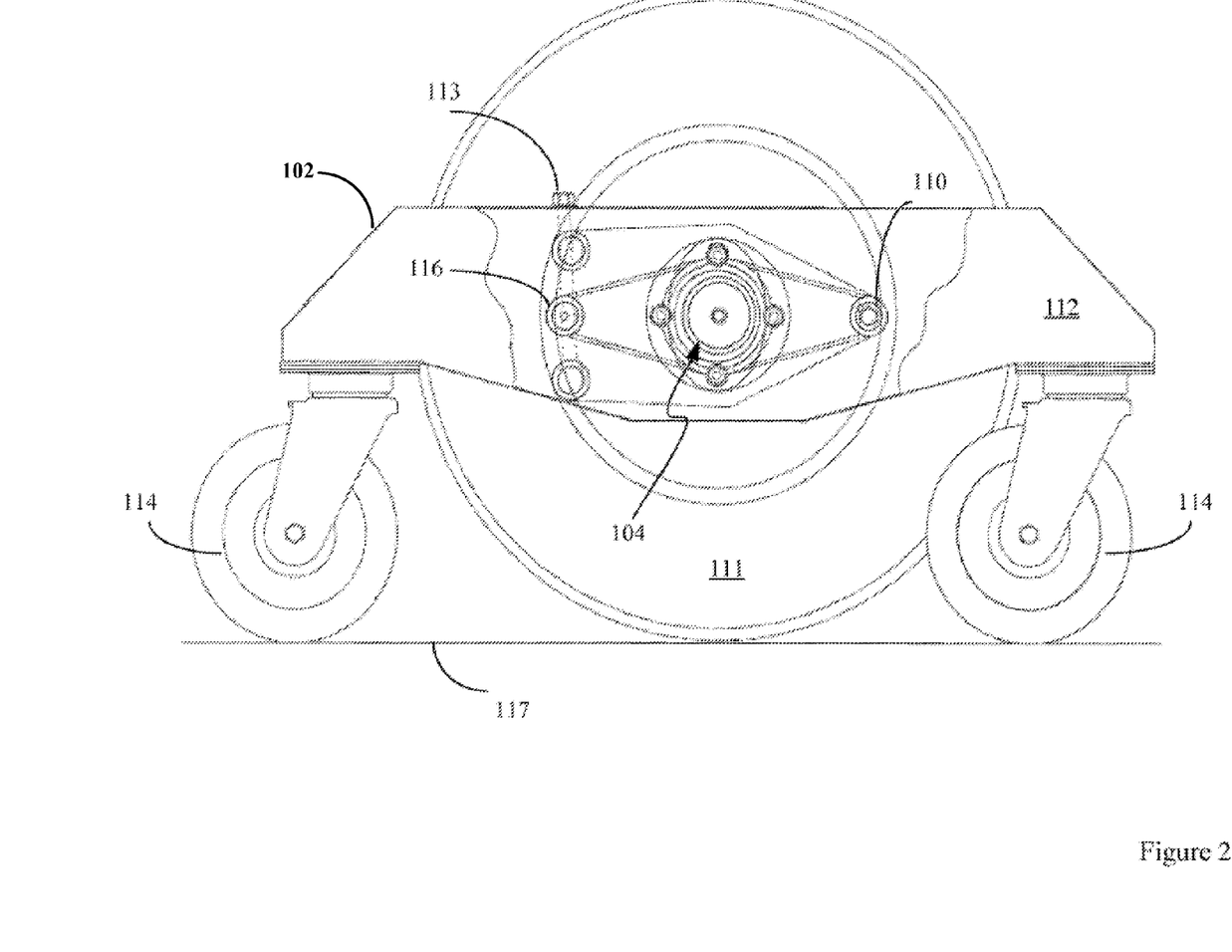
FIG. 2 illustrates a partial cut-away view of the drift lift apparatus of FIG. 1.

With reference to FIGS. 1 and 2, an example embodiment of a drift lift apparatus 100 is shown. Drift lift apparatus 100 includes a main frame or housing unit 102 and a hub unit 104, which are configured to be securely and rotatably coupled to one another. Main housing unit 102 is configured to define an internal space that accommodates or accepts a swing arm 106, pivotally connected therewithin, to be discussed in more detail hereafter. In one particular embodiment, main housing unit 102 includes two (2) caster wheels or swivel caster assemblies 108, attached at a bottom end thereof. Alternatively, main housing unit 102 may be equipped with only one caster wheel assembly 108.

Figure 3:
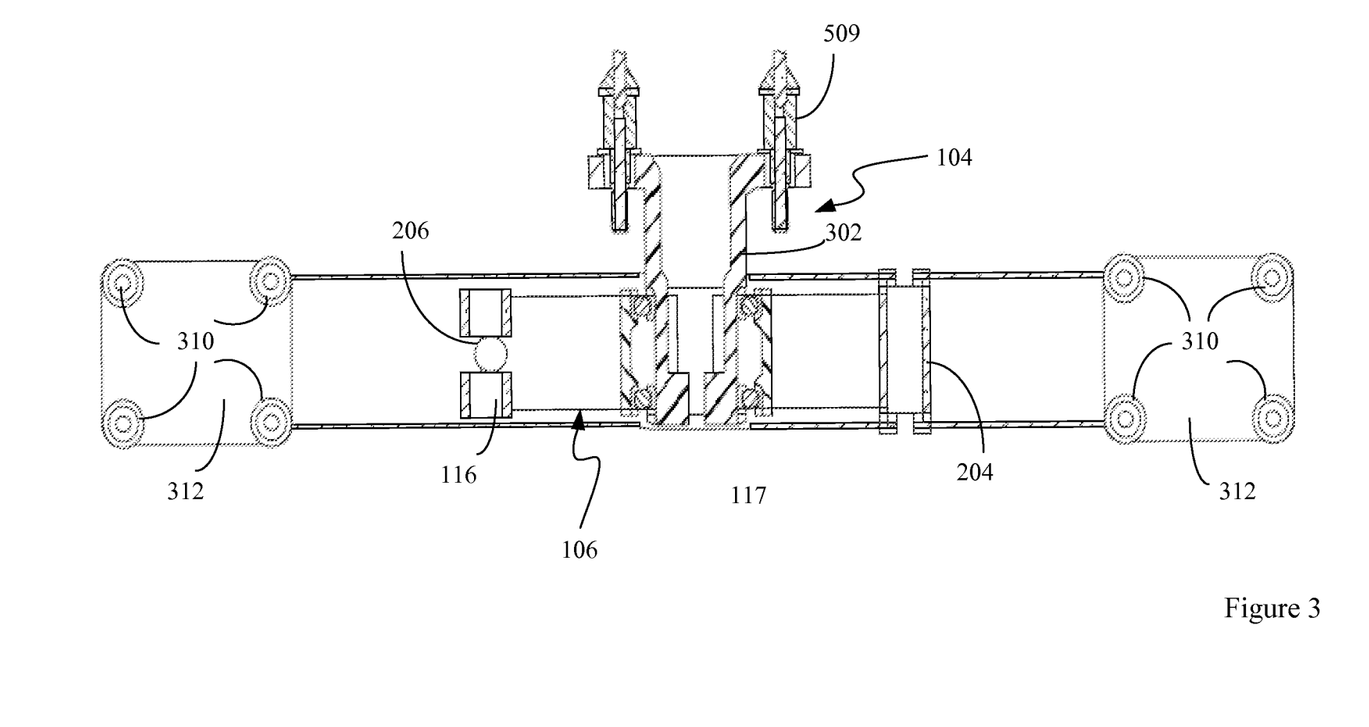
FIG. 3 illustrates a cross-sectional view of the drift lift apparatus along line A-A of FIG. 1.
Figure 6:
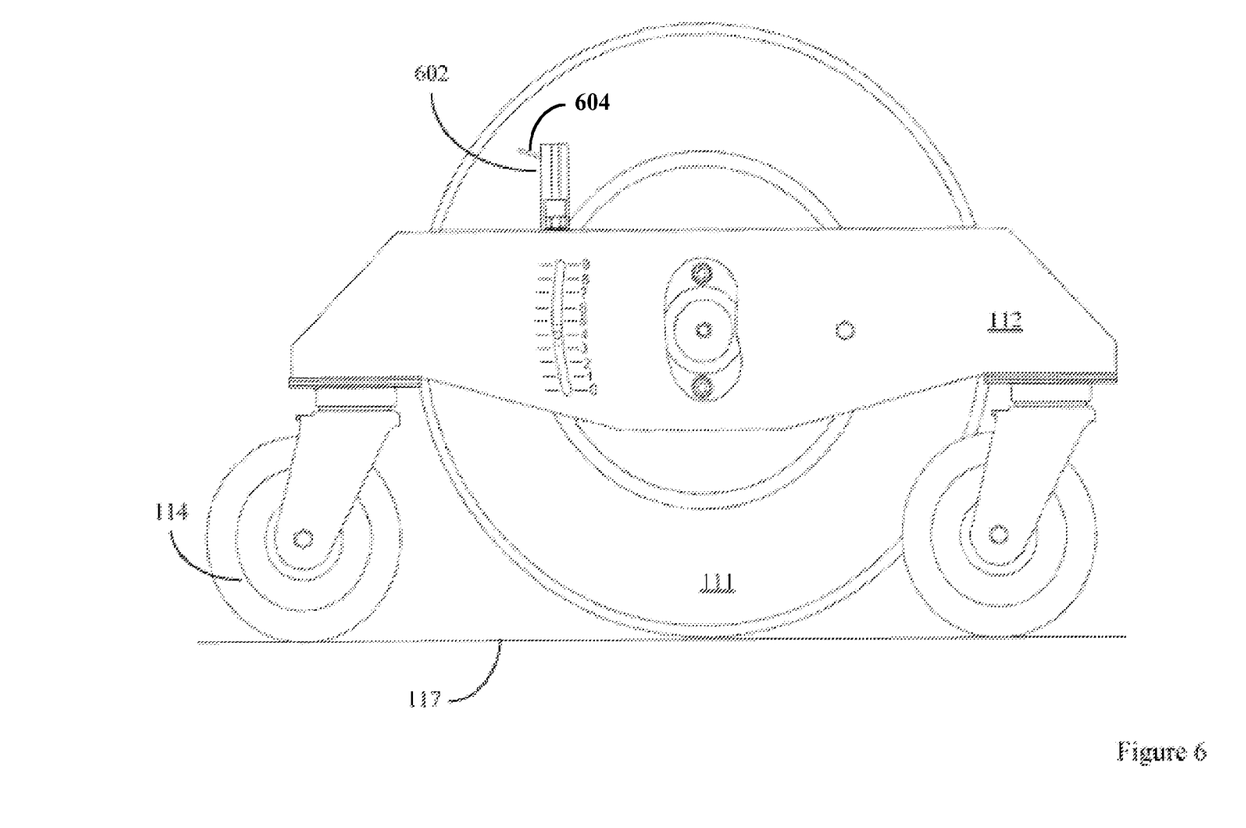
FIG. 6 illustrates a front elevational view of an example embodiment of a drift lift apparatus equipped with a hydraulic mechanism for adjusting a friction level between a corresponding wheel and a road surface.
Figure 7:
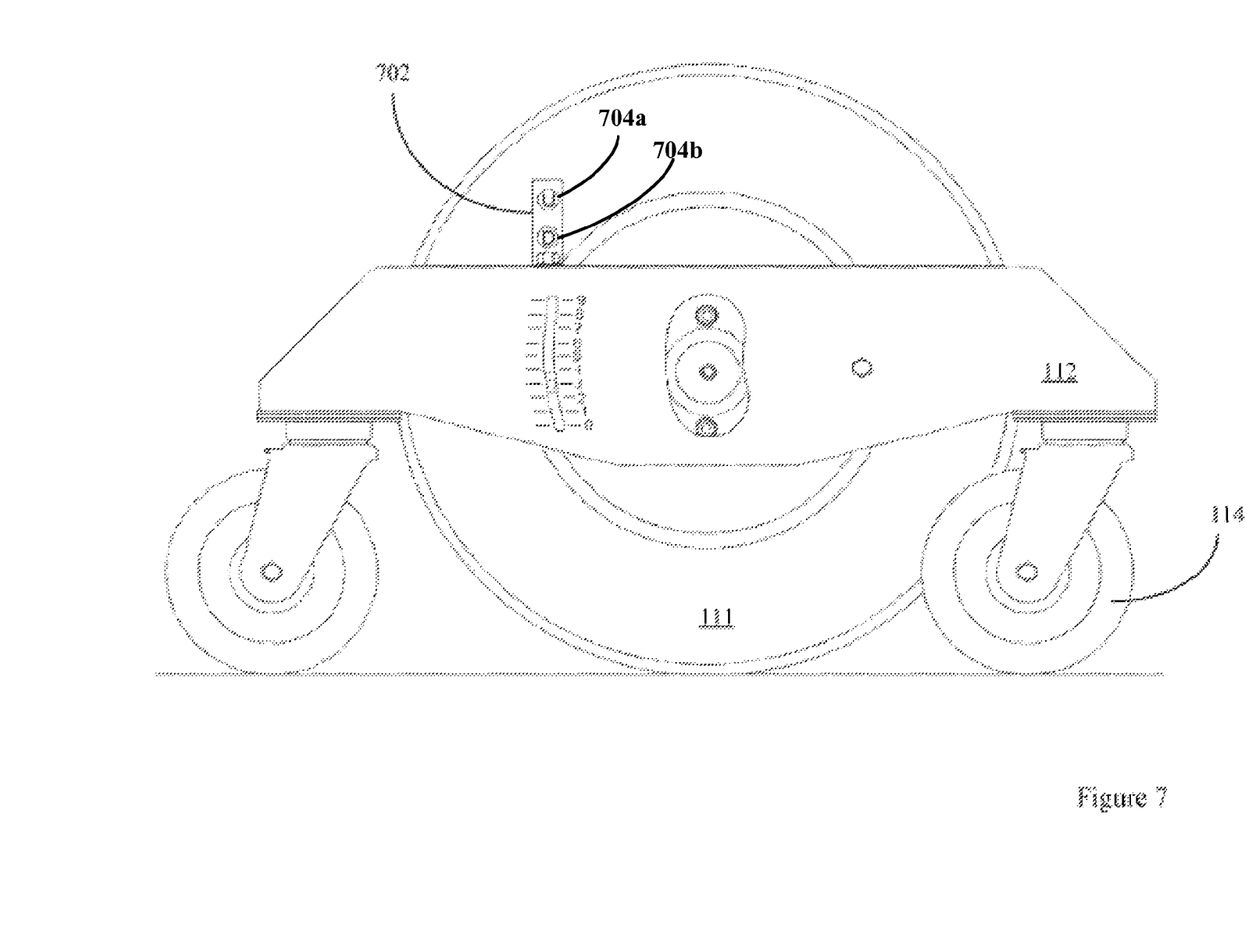
FIG. 7 illustrates a front elevational view of an example embodiment of a drift lift apparatus equipped with an electrical mechanism for adjusting a friction level between a corresponding wheel and a road surface.
Figure 8:
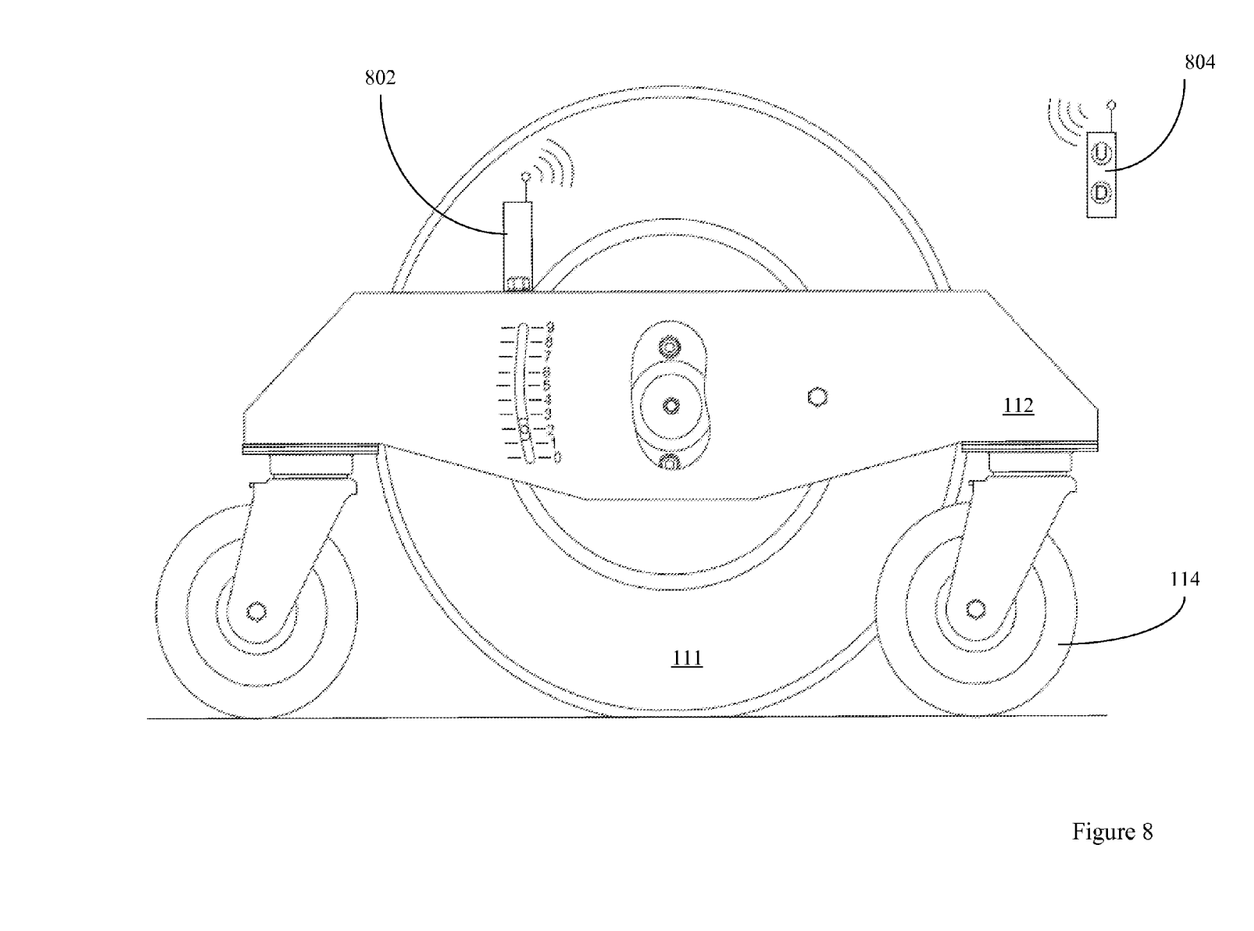
FIG. 8 illustrates a front elevational view of an example embodiment of a drift lift apparatus equipped with an electrical mechanism, having remote control capabilities, for adjusting a friction level between a corresponding wheel and a road surface.

In the example embodiment shown in FIGS. 1, 2 and 3, swing arm 106 is pivotally connected to main housing unit 102 via a fastener 110 that runs through a pivot bushing 204 that is transverse to the vertical sides of main housing unit 102. Main housing 102 includes a height adjusting mechanism 112 that includes a bolt or screw 113 that engages a threaded slot or hole 206 that traverses an adjustable height member 116 of swing arm 106. As such, adjustable height member 116 can be raised or lowered within main housing unit 102 by mechanically turning bolt or screw 113 in a clockwise or counterclockwise direction, respectively. The raising or lowering of adjustable height member 116 can be performed mechanically by operating or turning adjusting bolt 113 via a wrench, as needed. Moreover, main housing unit 102 includes a wheel height indicator 118 that includes a substantially vertical slit or opening 119 through which can be viewed one end of adjustable height member 116. On an outside surface of main housing unit 102, height indicator 118 includes a numbered scale to enable the user to determine visually a vertical position of adjustable height member 116 within main housing unit 102. As such, a vertical displacement of adjustable height member 116 can be followed visually while the user is operating adjusting bolt 113, thereby determining by how much the contact of a wheel 111 with a road surface 117 has increased or decreased, as shown in FIGS. 6-8.

Figure 4A:
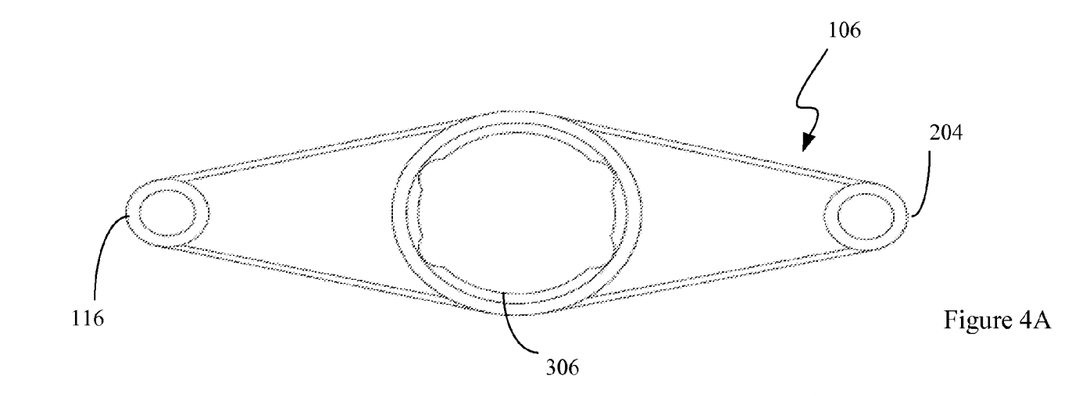
FIG. 4A illustrates a side elevational view of an example embodiment of a swing arm of the drift lift apparatus of FIG. 1.
Figure 4B:
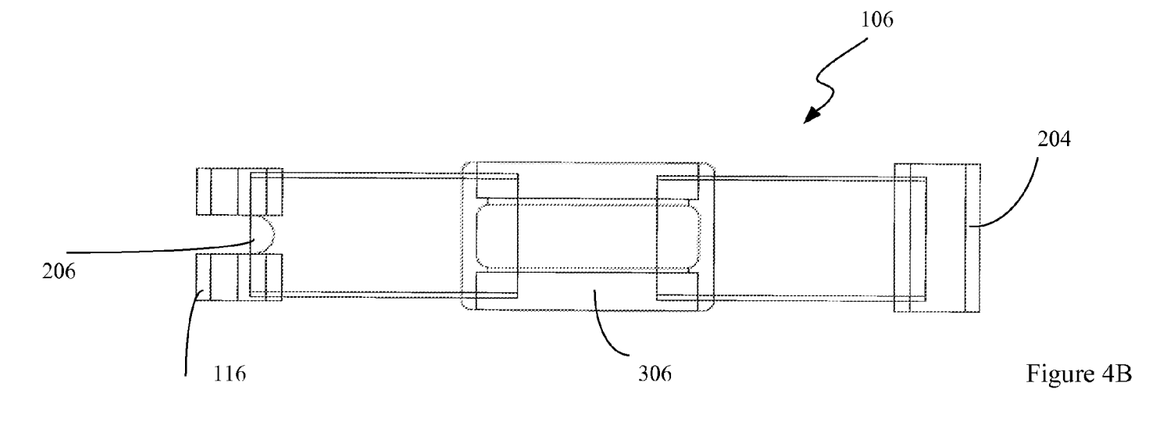
FIG. 4B illustrates a top plan view of the swing arm of FIG. 4A.

Now referring to FIGS. 3, 4A, and 4B, swing arm 106 includes centrally a bearings unit 306 that is configured to engagingly accept therethrough a longitudinal portion 302 of hub unit 104. Based on this configuration of swing arm 106, when hub unit 104 is made to rotate with wheel 111, bearings unit 306 does rotate along with hub unit 104, but the remaining elements or parts of swing arm 106 do not rotate along and remain fixed relative to main housing 102. As stated above, at one longitudinal end, swing arm 106 includes pivot bushing 204. At the other longitudinal end, swing arm 106 includes adjustable height member 116.

Now referring back to FIGS. 1 and 3, caster wheel assemblies 108 are attached to opposite longitudinal ends of a bottom end of main housing 102 via fasteners 310, and include a plate 312 with bearings (not shown) that allow wheels 114 to rotate 360 degrees along a vertical axis thereof. Each of wheels 114 is configured to support at least a suitable partial weight of the vehicle while drift lift apparatus 100 is in use. Moreover, drift lift apparatus 100 may include a rod (not shown) detachably affixed to and extending from main housing 102. At a free end of the rod can be affixed a commercially available line marker, which can be white or any other desirably visible color, to mark a parallel trajectory taken by wheel 111 to which drift lift apparatus 100 is associated. Alternatively, the rod may be attached to any other suitable location on the vehicle in proximity of wheel 111.

Figure 5A:
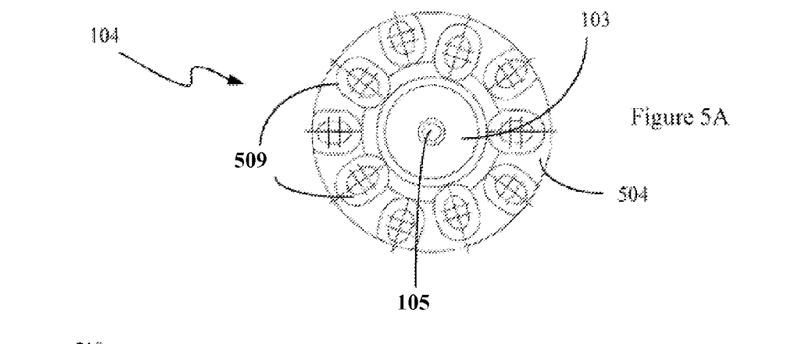
FIG. 5A illustrates a front elevational view of an example embodiment of a hub of the drift lift apparatus of FIG. 1.
Figure 5B:
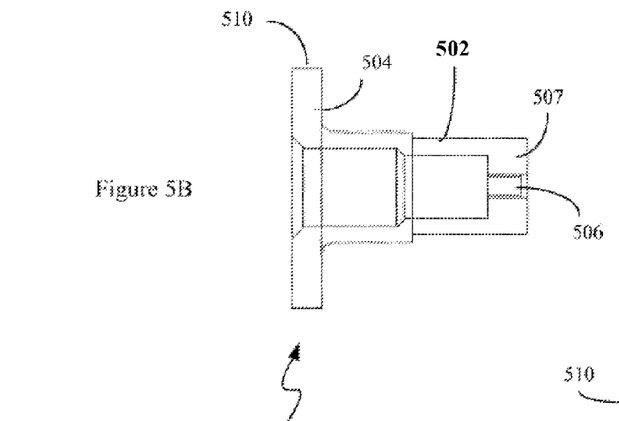
FIG. 5B illustrates a side elevational view of the hub of FIG. 5A.
Figure 5C:
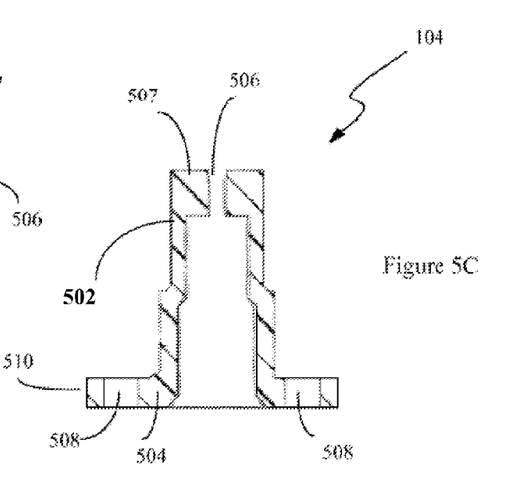
FIG. 5C illustrates a longitudinal cross-sectional view of the hub of FIG. 5A.

Now referring to FIGS. 5A-5C, in one embodiment, hub unit 104 includes a substantially cylindrically shaped portion 502 and a flange 504 at one end thereof. As shown, portion 502 tapers away from flange 504, and includes a threaded hole 506 at one distal end 507 from flange 504, suitable for a threaded fastener (not shown), such as a bolt or the like, to securely and rotatably affix main housing unit 102 thereto. Alternatively, portion 502 may not taper away from flange 504, and may keep a substantially cylindrical shape, or may increase circumferentially as desired away from flange 504. Flange 504 includes a plurality of slots or through holes 508, distributed circumferentially between a circumferential edge 510 of flange 504 and portion 502. Each of slots 508 may be dimensioned to engage and fit over a wheel stud 509. Wheel nut studs 509 are configured to replace or take the place of a vehicle's wheel nuts, which typically securely retain wheel 111 onto a corresponding wheel axle (not shown). Wheel nut studs 509 may be basically the same for any vehicle but may need to be changed to fit different wheel lug threads on a particular vehicle. Once securely attached to the wheel's axle via wheel nut studs 509, hub unit 104 is configured to be concentric to the wheel's axle.

In another embodiment, shown in FIG. 6, height adjusting mechanism 112 includes a hydraulic mechanism 602 coupled to adjustable height member 116, for raising or lowering it as desired by operating a lever 604. Hydraulic mechanism 602 can be configured in a substantially similar manner as a hydraulic jack.

In another alternate embodiment, shown in FIG. 7, height adjusting mechanism 112 includes an electrical adjusting mechanism 702 coupled to adjustable height member 116. As illustrated, electrical adjusting mechanism 702 may include two buttons 704a and 704b, marked by letters "U" and "D" to indicate which button can be used or activated to raise or lower adjustable height member 116, respectively. Alternatively, buttons 704a and 704b may be marked by letters "R" and "L" to indicate similar functions as those of letters "U" and "D."

In yet another alternate embodiment, shown in FIG. 8, height adjusting mechanism 112 includes an alternate electrical adjusting mechanism 802 that includes a remote control system (not shown) for wirelessly raising or lowering adjustable height member 116 from a suitable distance, via a mobile remote control unit 804, such as from inside the vehicle. As such, remote controlled height adjusting mechanism 112 enables a driver or a passenger of the vehicle to adjust the level of friction between wheel 111 and road surface 117 without having to exit the vehicle or even stop the vehicle. Moreover, remote controlled adjusting mechanism 802 may be positioned at any other location on main housing 102 without affecting its purpose to raise and lower adjustable height member 116, thereby altering the level of friction as desired.

Figure 9:
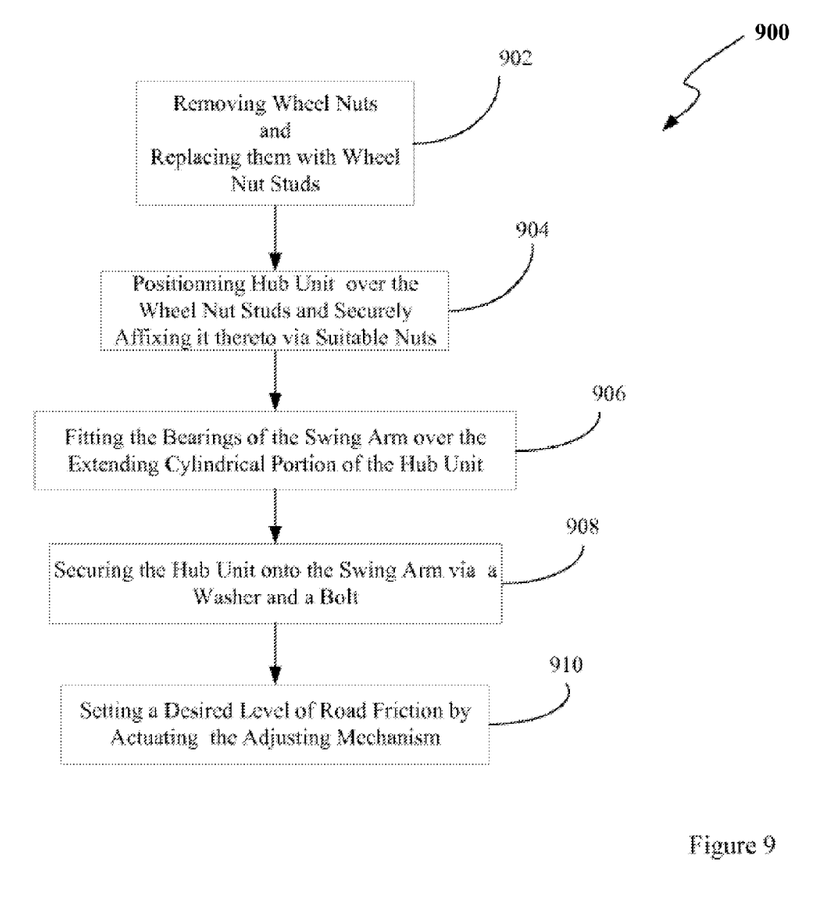
FIG. 9 is a flow chart illustrating a method for fitting the drift lift apparatus of FIG. 1 onto a vehicle.

Now referring to FIG. 9, an example embodiment of a flow chart 900 illustrating a method for installing drift lift apparatus 100 on wheel 111 of the vehicle, and utilizing it to simulate skids and drifts. At step 902, the vehicle's wheel nuts are removed, while leaving wheel 111 in place, and replaced by wheel nut studs 509. Hub unit 104 is first positioned such a subset of slots 508 engages a corresponding set of wheel nut studs 509, and is then securely affixed to wheel nut studs 509 by tightening corresponding nuts thereto, at step 904.

Subsequently, at step 906, main housing 102 is brought to hub unit 104 such that bearings unit 306 is engagingly fitted over the extending portion 302, and hub unit 104 is rotatably securely connected to swing arm 106 via a washer 103 and a bolt 105 fitted to the threaded hole 506, at step 908. The desired level of road friction is then attained by raising or lowering adjustable height member 116 within main housing 102 to a corresponding height, at step 910. That is, height adjusting mechanism 112 is operated or actuated to raise or lower wheel 111 off the road surface 117 until the desired level of contact or friction is reached. Once equipped with drift lift apparatus 100, the testing vehicle can be driven along a marked course, and its speed increased after each target distance or each lap while attempting to keep the vehicle under control, thereby learning how to handle skidding and drifting conditions.

As discussed above, drift lift apparatus 100 can be fitted onto the front wheels or rear wheels of a vehicle in short period of time, such as for example a matter of minutes. As such, drift lift apparatus 100 helps mitigate the need to have a dedicated car in order to simulate skid and drift conditions. By fitting it onto front wheels or rear wheels, a driver can simulate under-steering as well as over-steering. Advantageously, a road contact patch of the tire of wheel 111, to which drift lift apparatus 100 is connected, can be changed continuously in substantially very small increments, such as in inches or even millimeters for example, by lowering or raising adjustable height member 116, which enables the vehicle to slide or drift as if being driven on ice or snow even at low vehicle speeds of about 5 or 10 miles per hour.

Alternatively, height adjusting mechanism 112 may be configured to alter the road contact patch in small discrete increments, rather in fine continuous increments. Further, when the vehicle, which is equipped drift lift apparatus 100, is turned into a corner, the lowered friction level on the vehicle tires can cause the vehicle to yaw in the direction of the lateral acceleration. Thus, drift lift apparatus 100 can be attached to either the rear wheels to simulate an over-steer or rear wheel slide or yaw conditions, or to the front wheels to simulate an understeer or front yaw conditions.

Moreover, drift lift apparatus 100 can be attached to any vehicle that has wheels, including, but not limited to cars, sport utility vehicles (SUV), mini-vans, trailers, semi-tractors, semi-trailers, golf carts, and go-carts. As stated above, drift lift apparatus 100 is configured to help teach drivers, in particularly student drivers, the true effects that speed has when cornering, as it can be adjusted to skid or drift at different speeds. For example, the student driver may drive the vehicle around a "course" marked on a flat pavement area at a certain speed where the vehicle reacts as it should, but as the speed increases the centrifugal force overcomes the traction of the tires and the vehicle may skid or drift in the direction of the centrifugal force. Therefore, with the driven vehicle equipped with drift lift apparatus 100, the student driver is able to practice how to control or minimize skids and drifts in a safe and controlled manner.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. An apparatus for teaching defensive driving comprising:
a hub unit configured to attach to an axle of a vehicle via a plurality of wheel nut studs, wherein each of the wheel nut studs is configured to: (a) replace a wheel nut that secures a wheel to the axle and (b) secure the wheel to the axle; and a housing unit comprising:
  (i) a height-adjustable member operable to adjust an amount of friction between the wheel and a road surface by adjusting a height of the wheel relative to the road surface;
  (ii) a swing arm member configured to engage a portion of each of the hub unit and the height-adjustable member, wherein one end of the swing arm member is pivotally affixed to the housing unit;
  (iii) a wheel-height adjusting mechanism coupled to the height-adjustable member and configured to operate the height-adjustable member to adjust the height of the wheel relative to the road surface; and
  (iv) at least one wheel assembly, wherein the at least one wheel assembly comprises at least one support wheel configured to swivel about a vertical axis and to contact the road surface.

2. The apparatus of claim 1, wherein the hub unit includes a flange portion, and wherein the hub unit is configured to attach to the axle at the flange portion.

3. The apparatus of claim 1, wherein the swing arm member further comprises a bearings unit configured to engage the portion of the hub unit, and wherein the hub unit and the bearings unit are further configured to rotate with the axle.

4. The apparatus of claim 1, wherein the wheel-height adjusting mechanism comprises a hydraulic mechanism that is coupled to the height-adjustable member, and wherein the hydraulic mechanism is configured to operate the height-adjustable member.

5. The apparatus of claim 4, wherein:
  to increase the height of the wheel relative to the road surface, the hydraulic mechanism is operable to increase a hydraulic force applied to the height-adjustable member, and
  to decrease the height of the wheel relative to the road surface, the hydraulic mechanism is operable to decrease the hydraulic force applied to the height-adjustable member.

6. The apparatus of claim 1, wherein the wheel-height adjusting mechanism comprises an electrical adjustment mechanism that is coupled to the height-adjustable member, wherein the electrical adjustment mechanism is configured to operate the height-adjustable member.

7. The apparatus of claim 6, wherein the electrical adjustment mechanism comprises a first button and a second button, wherein the electrical adjustment mechanism is configured to operate the height-adjustable member to increase the height of the wheel relative to the road surface when the first button is depressed, and wherein the electrical adjustment mechanism is configured to operate the height-adjustable member to decrease the height of the wheel relative to the road surface when the second button is depressed.

8. The apparatus of claim 6, wherein the electrical adjustment mechanism is configured to:
  receive an input via a remote control device, wherein the input includes an indication of an adjustment to the height of the wheel relative to the road surface; and
  in response to receiving the input, operate the height-adjustable member to apply the adjustment.

9. The apparatus of claim 1, wherein the wheel-height adjusting mechanism comprises a mechanical component that is coupled to the height-adjustable member, wherein the mechanical component is configured to rotate in order to operate the height-adjustable member.

10. The apparatus of claim 9, wherein the mechanical component is one of a bolt or a screw.

11. The apparatus of claim 1, wherein the housing unit further comprises a wheel height indicator configured to provide an indication of the height of the wheel relative to the road surface.

12. The apparatus of claim 11, wherein the wheel height indicator is coupled to the adjustable height member.

13. The apparatus of claim 1, wherein the at least one wheel assembly is affixed at a bottom end of the housing unit.

* * * * *